United States Patent [19]

Merkle et al.

[11] 3,948,052
[45] Apr. 6, 1976

[54] INSTALLATION OF AN EXHAUST GAS TURBO-CHARGER AT AN INTERNAL COMBUSTION ENGINE

[75] Inventors: Roland Merkle, Stuttgart; Wolfgang Rapp, Esslingen; Friedrich Noltemeyer, Hohenacker, all of Germany

[73] Assignee: Daimler-Benz Aktiengesellschaft, Germany

[22] Filed: Oct. 26, 1973

[21] Appl. No.: 409,941

[30] Foreign Application Priority Data

Oct. 27, 1972  Germany............................ 2252705

[52] U.S. Cl.............................. 60/605; 123/119 C
[51] Int. Cl.²..................... F02B 33/40; F02B 33/44
[58] Field of Search.............. 60/597, 605, 612; 123/52 MC, 52 M, 55 V, 55 VF, 55 VE, 55 VS, 119 C

[56] References Cited
UNITED STATES PATENTS

| | | | |
|---|---|---|---|
| 1,921,907 | 8/1933 | Buchi | 60/605 |
| 2,574,694 | 11/1951 | Ericson | 123/52 M |
| 2,730,861 | 1/1956 | Buchi | 60/605 |
| 3,292,364 | 12/1966 | Cazien | 60/605 |
| 3,396,532 | 8/1968 | Munk | 60/605 |
| 3,673,798 | 7/1972 | Kuehl | 60/605 |

FOREIGN PATENTS OR APPLICATIONS

| | | | |
|---|---|---|---|
| 894,342 | 3/1944 | France | 123/55 V |
| 352,912 | 8/1931 | United Kingdom | 60/605 |

*Primary Examiner*—William L. Freeh
*Assistant Examiner*—L. J. Casaregola
*Attorney, Agent, or Firm*—Craig & Antonelli

[57] ABSTRACT

An exhaust gas channel system which is arranged in the cylinder head of an internal combustion engine and in the housing of an exhaust gas turbo charger flangedly connected to an exhaust flange disposed along the side of the cylinder head; the exhaust apertures of each cylinder are thereby each arranged in that half portion of the respective cylinder which is disposed nearest the cross center plane of the cylinder head while the exhaust gas channels are constituted exclusively by cast-in walls of the cylinder head, on the one hand, and of the exhaust gas turbo-charger, on the other; the latter is threadably connected to the exhaust flange of the cylinder head by means of a complementary counter-flange matched to the exhaust flange of the cylinder head.

7 Claims, 3 Drawing Figures

INSTALLATION OF AN EXHAUST GAS TURBO-CHARGER AT AN INTERNAL COMBUSTION ENGINE

The present invention relates to an exhaust gas channel system and to an exhaust gas channel connection system appertaining thereto, which is arranged in the cylinder head of an internal combustion engine, preferably of a reciprocating-piston in-line engine, and in the housing of an exhaust gas turbo-charger. The exhaust gas channels thereby lead to a longitudinal side of the cylinder head and terminate in an exhaust flange common to all exhaust gas channels which is disposed at this side.

In known attachments of exhaust gas turbo-chargers at internal combustion engines having several combustion spaces, the exhaust gases are fed to the turbine in such a manner that a connecting line is arranged between the exhaust gas discharge openings of the cylinder head and the inlet means in the turbine housing or that the exhaust gases are fed to the turbine by means of a common line or separate individual lines by way of one or several inlet openings.

It is the aim of the present invention to construct and arrange the channel layout from the combustion spaces to the turbine housing and especially to construct the turbine housing itself in such a manner that this connecting line is eliminated as a separate part. The turbine housing additionally should include the exhaust gas channels without significant enlargement and its exhaust gas inlet flange is to be directly connected with the exhaust gas discharge flange of the internal combustion engine housing. No additional structural volume for the exhaust gas turbo-charger connection is to result therefrom and exhaust gas lines which are as free as possible from bends and which are so short as possible are to be achieved between the combustion spaces and the turbine inlet. Such exhaust gas lines as mutually disturb each other or unfavorably influence one another by reason of the ignition sequence of the internal combustion engine are to be so extended up to the turbine inlet that such a disturbance is eliminated.

The problems underlying the present invention are solved in that the exhaust opening of each cylinder is arranged in that half portion of the cylinder which is disposed nearest the transverse center plane of the cylinder head and that the exhaust gas channels are constituted exclusively by cast walls of the cylinder head, on the one hand, and of the exhaust gas turbo-charger, on the other, whereby the exhaust gas turbo-charger is threadably connected by means of a counter-flange matched to the exhaust flange of the cylinder head directly at that exhaust flange which is preferably arranged directly at the edge of the cylinder head.

The exhaust gas lines from the combustion spaces to the turbine inlet may thereby be arranged symmetrically to the center plane of the cylinder head in order that the mutually corresponding channels have equal length to the greatest possible extent. This means that the exhaust gas channels both in the cylinder head as also in the turbine housing of the exhaust gas turbo-charger are formed by cast-in walls aligned with each other in the transition zones from cylinder head to exhaust gas turbo-charger, which feed the exhaust gases in the turbine housing tangentially to the turbine scroll case symmetrically to the cross center plane.

Furthermore, with a four-cylinder reciprocating piston in-line engine, the two center exhaust gas channels can be combined into a single center channel while still in the cylinder head, which single center channel finds its continuation by corresponding walls cast-in within the exhaust gas turbo-charger in a further center channel which conducts the exhaust gases, directly after the entry thereof into the turbine housing into the center area of the turbine scroll case.

The walls which form the outer exhaust gas channels may thereby conduct the exhaust gases to the turbine scroll case approximately at the same height, at which also the exhaust gases enter into the turbine scroll case out of the center channel. The discharge openings in the exhaust flanges are then arranged in a row adjacent one another.

On the other hand, with a four-cylinder reciprocating-piston in-line engine the two center exhaust gas channels may be constructed bandy-legged and may be extended to two discharge openings arranged adjacent one another in the exhaust flange of the cylinder head, whereby the discharge openings of the outer exhaust gas channels are provided in a similar manner above or below the discharge openings of the two center exhaust gas channels. The discharge openings are then arranged above and adjacent one another at least approximately in the form of a square.

Accordingly, it is an object of the present invention to provide an exhaust gas channel system for internal combustion engines, especially for reciprocating piston in-line engines which avoids by simple means the aforementioned shortcomings and drawbacks encountered in the prior art.

Another object of the present invention resides in the attachment of an exhaust gas turbo-charger at an internal combustion engine which permits an exhaust gas channel layout from the combustion spaces to the turbine housing in such a manner that a separate connecting line or lines can be dispensed with as separate structural parts.

A further object of the present invention resides in an exhaust gas channel system for an internal combustion engine provided with an exhaust gas turbo-charger, in which the exhaust gas channels are incorporated in the turbine housing without significant enlargement of the latter, thereby avoiding any increase in the structural volume for the exhaust gas turbo-charger.

Another object of the present invention resides in an exhaust gas channel system and exhaust gas channel connecting system belonging thereto for an internal combustion engine equipped with an exhaust gas turbo-charger, in which the exhaust gas turbo-charger is adapted to be directly connected by means of its exhaust gas inlet flange to the exhaust gas flange of the internal combustion engine housing and more particularly to the cylinder head.

Still a further object of the present invention resides in an internal combustion engine equipped with a turbo-charger, in which exhaust gas lines between the combustion spaces and the turbine inlet are achieved that are as short as possible and as free of curves as possible so as to improve the flow characteristics.

These and further objects, features and advantages of the present invention will become more apparent from the following description when taken in connection with the accompanying drawing which shows, for purposes of illustration only, one embodiment in accordance with the present invention, and wherein.

Figure 1:
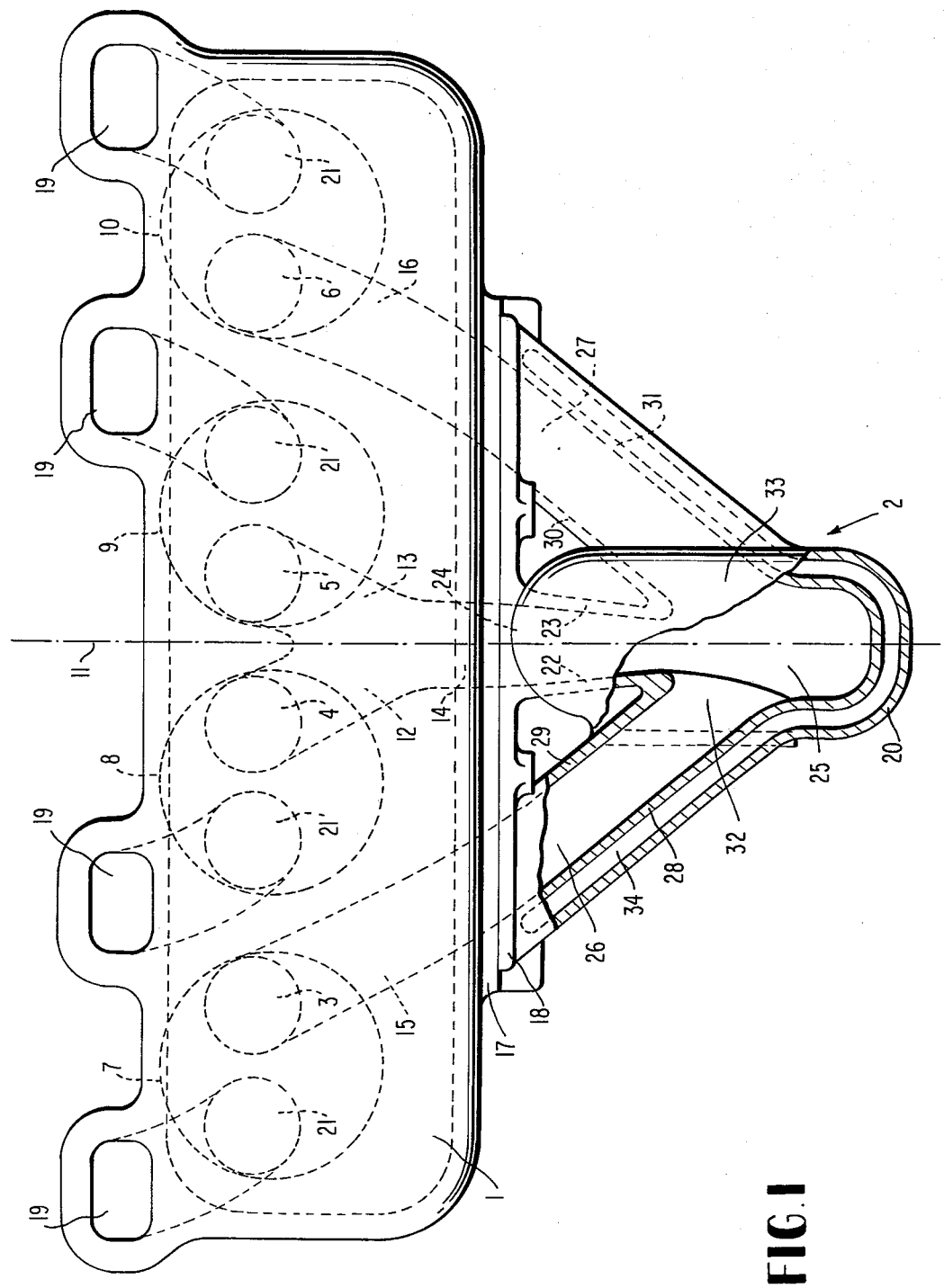
FIG. 1 is a plan view, partly in cross section, on an exhaust gas turbo-charger threadably connected at a cylinder head of a multicylinder reciprocating piston-in-line cylinder engine in accordance with the present invention.
Figure 2:
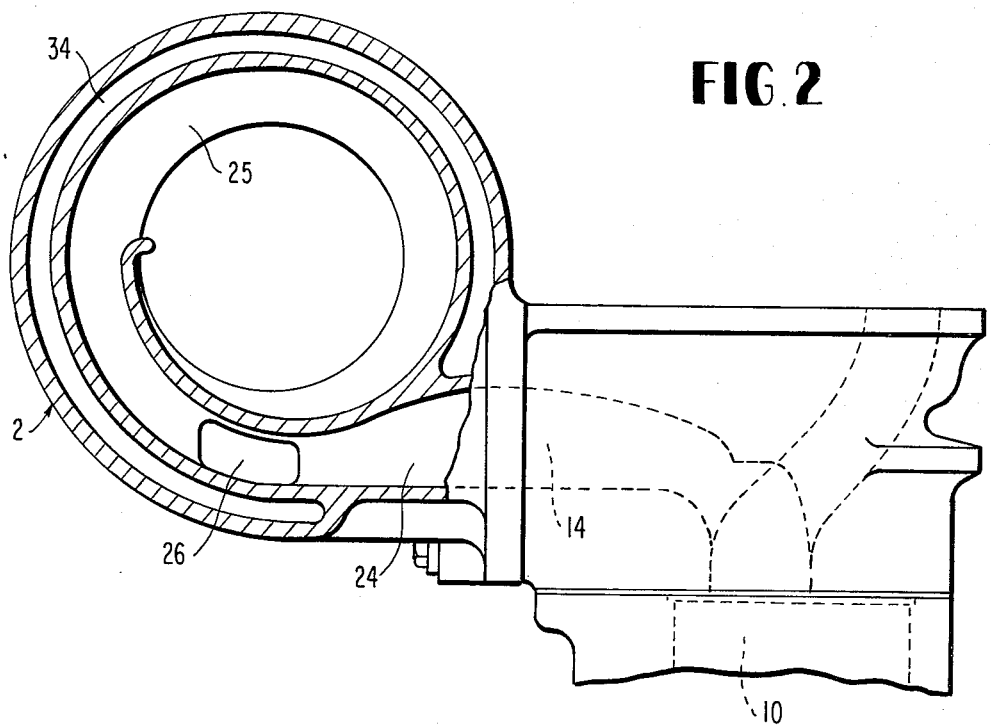
FIG. 2 is a partial side elevational view, partly in cross section, of the cylinder head together with the exhaust gas turbo-charger.

Referring now to the drawing wherein like reference numerals are used throughout the various views to designate like parts, an exhaust gas turbo-charger generally designated by reference numeral 2 is threadably connected, for example, by means of bolts, at the cylinder head 1 of a four-cylinder reciprocating piston internal combustion engine. The exhaust apertures 3, 4, 5 and 6 of the cylinders 7, 8, 9 and 10 are arranged in each case in the half of the cylinders 7–10 which is disposed nearest the cross center plane 11 of the cylinder head 1. In this manner, the channel lay-out of the exhaust gas channels 12 and 13 adjoining the two center exhaust openings 4 and 5 are not impaired by inlet channels and the combination into a common center channel 14 is made possible thereby. The outer exhaust gas channels 15 and 16 adjoin the two exhaust openings 3 and 6 which are disposed father away from the cross center plane 11; the exhaust gas channels 15 and 16, like the channels 12, 13 and 14 are formed by cast walls in the cylinder head 1 and terminate in an exhaust flange 17 arranged just at the edge of the cylinder head 1, at which the turbine housing of the exhaust gas turbo-charger 2 is threadably connected by means of a corresponding counter-flange 18 in which the channels are further extended to the inlet of the turbine scroll case 25.

As a result of this arrangement, separate pipe lines, possibly even flexible lines, and by-pass lines, for example, of one channel behind the other, in order to be able to combine with a third channel, which are otherwise normally provided between the cylinder head and the exhaust gas turbo-charger, can be dispensed with by the present invention.

The exhaust gas channels 12, 13, 14, 15 and 16 in the cylinder head 1 find their continuation by means of walls 22, 23, 28, 29, 30 and 31 cast-in in the turbine housing 20, which form further channels that conduct the exhaust gases tangentially to the turbine scroll case 25 symmetrically to the center plane 11.

By a corresponding combination of the exhaust gas channels in the turbine housing 20, the exhaust gas turbine is adapted to be acted upon either by a single inflow or by several inflows at a single level or different levels.

Figure 3:
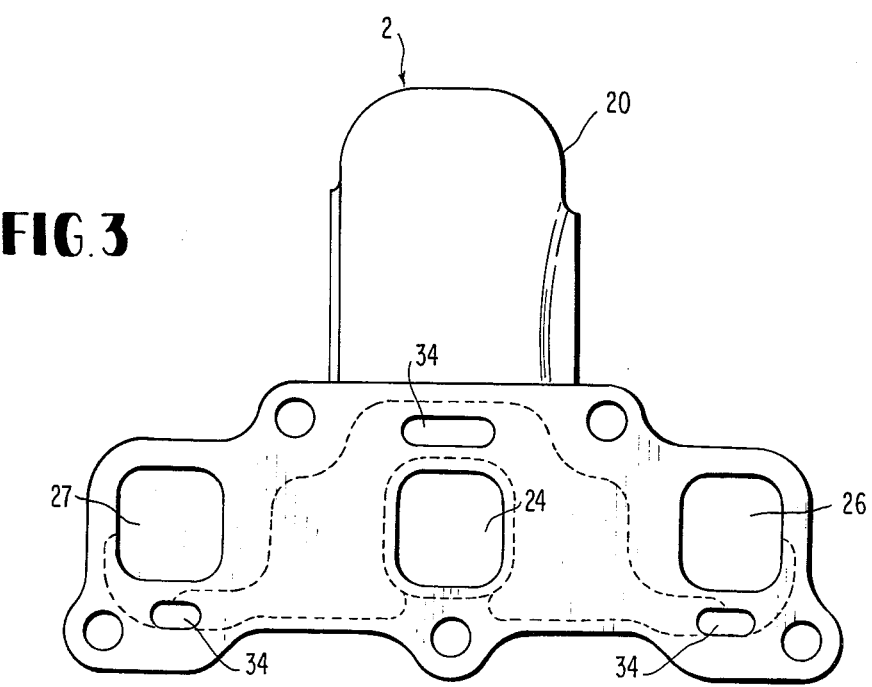
FIG. 3 is an elevational view of the exhaust gas turbo-charger as viewed from the cylinder head side thereof.

Additionally, with a four-cylinder reciprocating-piston in-line engine, the walls 28 – 31 which form the outer exhaust gas channels 26 and 27 of the exhaust gas turbo-charger 2, may be so constructed that they conduct the exhaust gases to the turbine scroll case 25 approximately at the same height at which also the exhaust gases enter the turbine scroll case 25 out of the center channel 14, 24. This means, as shown in FIG. 3, an arrangement of the discharge openings in the exhaust flange adjacent one another.

On the other hand, in a four-cylinder reciprocating-piston in-line engine the two center exhaust channels may be constructed bandy-legged and may be extended to two discharge openings arranged adjacent one another in the exhaust flange 17 of the cylinder head 1, above or below which are provided in a similar manner discharge openings of the outer exhaust gas channels. The discharge openings are then arranged at least approximately in the shape of a square above and adjacent one another.

The turbine housing 20 may be air-cooled or water-cooled. For the latter purpose, a cooling water jacket 34 is provided in the illustrated embodiment which is connected to the cooling water circulatory system of the engine and receives cooling water by way of corresponding openings in the flanges 17 and 18.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. An exhaust gas channel system of a four-cylinder reciprocating piston in-line engine which comprises a cylinder head provided with an exhaust flange means along the side of the cylinder head and an exhaust gas turbo-charger having a housing means connected to the exhaust flange means of the cylinder head, the exhaust gas channel system being arranged in the cylinder head and in the housing means of the exhaust gas turbo-charger, characterized in that the internal combustion engine includes cylinder means having exhaust aperture means arranged in that half of the respective cylinder means disposed nearest a cross center plane of the cylinder head, and exhaust gas channel means formed substantially exclusively by cast-in walls of the cylinder head and cast-in walls of the exhaust gas turbo-charger, said exhaust gas turbo-charger housing means including a counter-flange means matched to the exhaust flange means of the cylinder head, by means of which it is connected directly at the exhaust flange means of the cylinder head, the exhaust gas channel means are formed both in the cylinder head and also in the turbine housing means by cast-in wall means substantially aligned with each other in transition zones from cylinder head to exhaust gas turbo-charger, the turbo-charger housing means includes a turbine scroll case, the exhaust gases are conducted by the exhaust gas channel means in the turbo-charger housing means substantially tangentially to the turbine scroll case symmetrically to the cross center plane of the cylinder head, and in that the two center exhaust gas channel means are combined into a central channel within the cylinder head, said central channel being continued in a further center channel by corresponding wall means cast-in in the exhaust gas turbo-charger, which further center channel, directly downstream of the entry thereof into the housing means, conducts the exhaust gases into a center area of the turbine scroll case.

2. An exhaust gas channel system according to claim 1, characterized in that the cylinder head includes an edge, and in that the exhaust flange means is arranged directly at said edge.

3. An exhaust gas channel system according to claim 1, characterized in that the two outer exhaust gas channel means conduct the exhaust gases to the turbine scroll case approximately at the same height, at which the exhaust gases also enter the turbine scroll case out of the center channel.

4. An exhaust gas channel system according to claim 3, characterized in that the cylinder head includes an edge, and in that the exhaust flange means is arranged directly at said edge.

5. An exhaust gas channel system of a four-cylinder reciprocating piston in-line engine which comprises a cylinder head provided with an exhaust flange means along the side of the cylinder head and an exhaust gas turbo-charger having a housing means connected to the exhaust flange means of the cylinder head, the exhaust gas channel system being arranged in the cylinder head and in the housing means of the exhaust gas turbo-charger; characterized in that the internal combustion engine includes cylinder means having exhaust aperture means each arranged in that half of the respective cylinder means disposed nearest a cross-center plane of the cylinder head, and exhaust gas channel means formed substantially exclusively by cast-in walls of the cylinder head and cast-in walls of the exhaust gas turbo-charger, said exhaust gas turbo-charger housing means including a counter-flange means matched to the exhaust flange means of the cylinder head, by means of which it is connected directly at the exhaust flange means of the cylinder head, and in that the turbo-charger housing means includes a turbine scroll case, and in that the two center exhaust gas channel means are combined into a center channel within the cylinder head, said center channel being continued in a further center channel by corresponding wall means cast-in the exhaust gas turbo-charger, which further center channel, directly downstream of the entry thereof into the turbine housing means, conducts the exhaust gases into a center area of the turbine scroll case.

6. An exhaust gas channel system according to claim 5, characterized in that the cylinder head includes an edge, and in that the exhaust flange means is arranged directly at said edge.

7. An exhaust gas channel system according to claim 5, characterized in that the two outer exhaust gas channel means conduct the exhaust gases to the turbine scroll case approximately at the same height, at which the exhaust gases also enter the turbine scroll case out of the center channel.

* * * * *